April 30, 1940.  F. RADELET ET AL  2,198,679

INTERNAL COMBUSTION ENGINE

Filed Nov. 30, 1935

Fig.3.ª

INVENTORS:
FERNAND RADELET
AND MAX SCHUL
BY Haseltine, Lake & Co.
ATTORNEYS

Patented Apr. 30, 1940

2,198,679

UNITED STATES PATENT OFFICE 2,198,679

INTERNAL COMBUSTION ENGINE

Fernand Radelet and Max Schul, Brussels, Belgium

Application November 30, 1935, Serial No. 52,308
In Belgium December 11, 1934

6 Claims. (Cl. 60—32)

An important factor of efficiency with internal combustion engines is the feeding thereof with fresh gas, which is dependent upon the more or less complete evacuation of burned gases, since any quantity of burned gases remaining in the cylinder will prevent the suction of a corresponding quantity of fresh gas. In order to obtain complete evacuation, it has been proposed to utilise the well known fact that, in an engine working on the two stroke cycle, the entire mass of burned gases escapes instantaneously from the cylinder as soon as the exhaust is opened, producing therein an almost complete vacuum, whereupon a portion of the gases flows back into the cylinder before the exhaust is closed. However, no satisfactory result has been obtained with any of the valve or by-pass means proposed until now in order to check this return flow of the gases and to make use of the temporary vacuum in the cylinder to promote the introduction of fresh gas. This failure appears to be due chiefly to the use of valve members with reciprocatory motion which, on account of their inertia, are incapable of acting with sufficient speed.

It is an object of our invention to overcome this difficulty, and in accordance therewith we prevent the burned gases from flowing back into the cylinder, by making use of a rotor having blades or the like which in the main, tend to allow of the gases flowing out, but are adapted to check any return flow into the cylinder owing to the pressure generated by them. This rotor is continuously rotated at high speed, its rotation being preferably kept up by the pressure of the burned gases flowing therethrough at each exhaust stroke. As distinguished from an exhaust gas extractor, the rotor according to our invention closely surrounds the exhaust ports, leaving no empty space or exhaust chamber therebetween, and the rotor blades during rotation of the rotor tend to prevent backflow through the exhaust ports.

Since the exhaust rotor produces a suction in the cylinder as it continues to run after the burned gases are exhausted, it could happen that some of the fresh gases let into the cylinder might reach the exhaust after the burned gases. To prevent this, we may associate with the rotor a valve member adapted to close the exhaust before the fresh gases are let into the cylinder, and if desired, to close the inlet while the exhaust takes place.

Preferably, though not necessarily, we may utilise the excess energy due to the pressure of the hot gases from the exhaust rotor to drive an inlet rotor adapted to supercharge the cylinder with fresh gases in order to promote its filling. The two rotors may be directly coupled with each other.

In the preferred embodiment of the invention, the exhaust rotor comprises a ring of blades which surrounds the cylinder opposite the exhaust ports arranged ring-fashion, said blades being so arranged and supported that they will be rotated by the action of the burned gases issuing from the exhaust ports. A second ring of blades may be secured to the first ring and form the inlet rotor, the blades of said second ring being directed in reverse direction to those of the first ring. As to the exhaust and inlet valve, it may comprise a circular slide valve coaxial with the rotor and adapted to be reciprocated for example by means of a cam.

In the accompanying drawing we have illustrated by way of example how the invention can be carried into practice in the case of a two-stroke engine.

Fig. 3 is a broken view, in axial section like Fig. 1, showing a slide valve, while Figure 3A shows a side view of the same.

Figure 1:
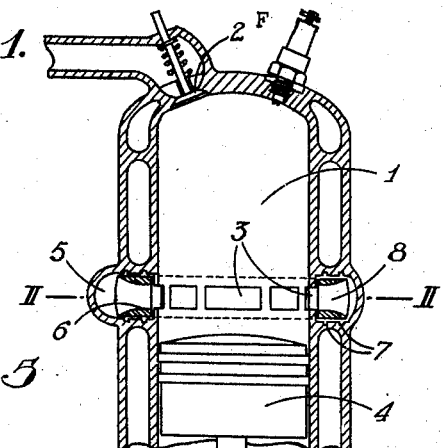
Fig. 1 is an axial section through a cylinder of the engine.
Figure 2:
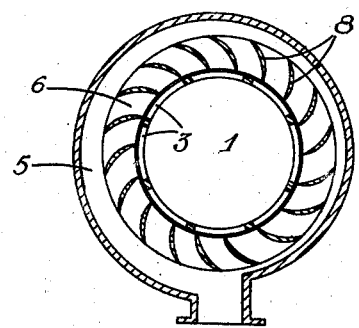
Fig. 2 is a cross-section through the cylinder and the exhaust rotor, on line II—II of Fig. 1.

Referring to Figs. 1 and 2, 1 is the cylinder of a two-stroke engine provided at the top with an inlet valve 2 for the fresh gases, and near the bottom wtih a circular row of exhaust ports 3 which are uncovered by the piston 4 in its lowermost position.

The ports 3 open into an exhaust chamber 5 of spiral shape, in which is mounted the annular exhaust rotor 6 supported in suitable bearings, for instance between circular oil grooves 7. The blades or vanes 8 of the rotor or turbine 6 are so shaped and directed that while they do not appreciably hinder the outward flow of the burned gases through the ports 3 and into the chamber 5, when rotating at high speed they prevent the gases flowing back into the cylinder before the piston 4 has covered the ports 3. It follows that only the fresh gases let in through the valve 2 are sucked by the vacuum into the cylinder and the cylinder is filled with a charge in which the fresh gases are diluted to a minimum degree by remaining burned gases.

Figure 3:
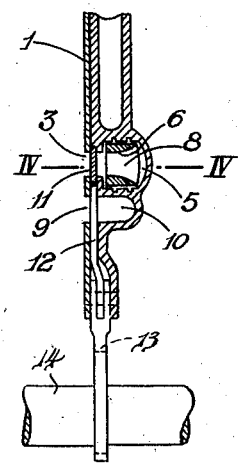
Figure 4:
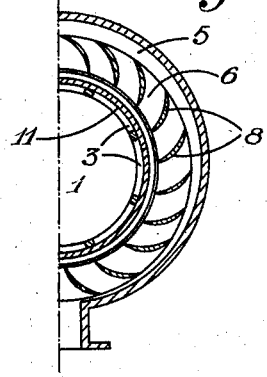
Fig. 4 is a cross-section on line IV—IV of Fig. 3.

It is understood that the rotation of the rotor keeps up the vacuum in the cylinder, after the expulsion of the burned gases and so long as the ports 3 are uncovered by the piston 4, whereby the intake of fresh gases is further favoured when the inlet is at a point of the cylinder remote from the exhaust ports, as shown in Fig. 1. However, when the intake ports are at the bottom of the cylinder 1 as shown at 9 in Fig. 3, and said ports 9 are uncovered by the piston 4 after the ports 3, it may happen owing to the proximity of the ports 3 and 9 that the fresh gases from the inlet chamber 10 are sucked immediately through the ports 3 by the rotor 6, instead of filling the cylinder. To prevent this, we provide a cylindrical slide 11 controlled by an arm 12 from an eccentric 13 on the engine shaft 14, which slide shuts all the exhaust ports 3 immediately after the expulsion of the burned gases, and re-opens them only after they are again covered by the piston 4. In the latter position, the said slide 11, which is co-axial with the rotor 6 as shown in Fig. 4, closes the inlet ports 9 thereby preventing the burned gases from entering the inlet chamber 10 during the exhaust period.

Figure 5:
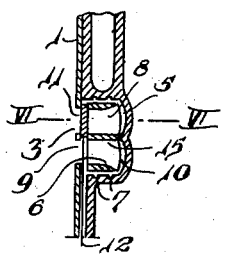
Fig. 5 is a broken view, in axial section like Figs. 1 and 3, through a cylinder with an inlet rotor as well as an exhaust rotor.
Figure 6:
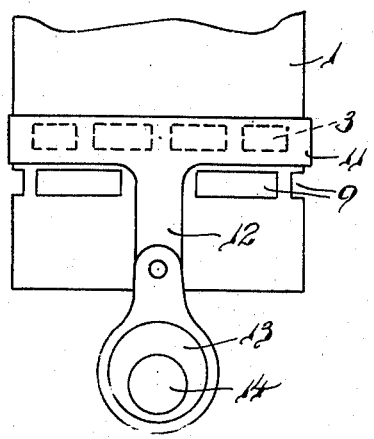
Fig. 6 is a cross-section on line VI—VI of Fig. 5.
Figure 6:
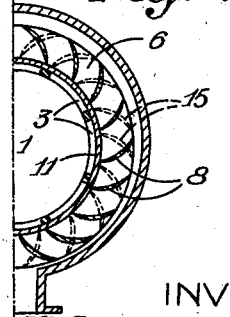

In Figs. 5 and 6, under the ring of blades 8 the rotor 6 carries a second ring of blades 15 located in the inlet chamber 10 opposite the ports 9. These blades 15 are directed in opposite direction to the blades 8 and they form a supercharging compressor which promotes the inflow of fresh gases through the ports 9 and assists in ensuring the complete filling of the cylinder during the very short time when a vacuum obtains therein after the burned gases have left.

An important advantage of the invention, when applied to engines of the two stroke type, is that it makes it possible to realise during a single revolution of the engine shaft the four phases of intake, compression, explosion and exhaust, separately and without confusion or overlapping between the exhaust, intake and compression. Thus a high efficiency may be attained, while benefiting of a reduced fuel consumption owing to the sharp separation of the phases which does not obtain with existing motors of the two stroke type.

Another advantage of the invention consists in the continuity of the flow of the exhaust gases due to the regularising action of the rotor whereby the usual jerky exhaust is converted into a smooth and substantially continuous flow.

Although the annular shape seems to be most advantageous for the rotor because it permits of using exhaust ports of wide section, it will be understood that the invention is not limited to this shape of rotor. Other constructional changes may also be made without departing from the scope of the appended claims and it will be understood that the invention is applicable to engines of the four stroke type as well as to two stroke engines.

We claim:

1. In an internal combustion engine, the combination of a power cylinder, a ring of exhaust ports in said cylinder, a light freely rotatable annular rotor immediately adjacent to and surrounding said ring of exhaust ports, bearings disposed in the cylinder walls and encircling said cylinder for rotatably supporting said rotor, said rotor being adapted to allow practically free outward flow but to prevent any inward flow through said exhaust ports.

2. In an internal combustion engine, the combination of a power cylinder, a ring of exhaust ports in said cylinder, a light annular rotor immediately adjacent said ports, said rotor comprising a ring of centrifugal turbine blades encircling said cylinder and mounted to rotate freely around the same, said blades during rotation of the turbine tending to allow free radial outward flow and prevent any inward flow of gases through said exhaust ports.

3. In an internal combustion engine, the combination of a power cylinder, a circular row of exhaust ports and an adjacent circular row of inlet ports in said cylinder, an annular rotor closely surrounding said cylinder, said rotor comprising a ring of blades encircling said row of exhaust ports and a ring of blades encircling said row of inlet ports, said former ring of blades being adapted to allow practically free outward flow but to prevent any inward flow through said exhaust ports, the blades of said latter ring being directed in opposite direction to the blades of said former ring.

4. In an internal combustion engine, the combination of a power cylinder, a circular row of exhaust ports and an adjacent circular row of inlet ports in said cylinder, an exhaust chamber surrounding said exhaust ports and an inlet chamber surrounding said inlet ports, a bladed ring mounted for rotation in said exhaust chamber immediately adjacent said exhaust ports and adapted to allow practically free outward flow but to prevent any inward flow through said exhaust ports, and a bladed ring mounted for rotation in said inlet chamber immediately adjacent said inlet ports and adapted to allow practically free inward flow but to prevent any outward flow through said inlet ports, said bladed rings being rigidly connected with each other.

5. In an internal combustion engine, the combination of a power cylinder, a circular row of exhaust ports and an adjacent circular row of inlet ports in said cylinder, an exhaust chamber of spiral shape surrounding said exhaust ports and an adjacent inlet chamber of similar shape surrounding said inlet ports, a rotor in said chambers comprising a bladed ring encircling said row of exhaust ports and a bladed ring encircling said row of inlet ports, and a cylindrical slide valve co-axial with said cylinder adapted simultaneously to close said exhaust ports and open said inlet ports and vice-versa.

6. In an internal combustion engine, the combination of a power cylinder, a circular row of exhaust ports in said cylinder, and means for preventing any inward flow through said exhaust ports, said means comprising a light annular turbine encircling said row of exhaust ports and adapted to be driven by the exhaust gases, bearings with circular oil grooves closely surrounding said cylinder, said turbine being freely rotatable in said bearings.

FERNAND RADELET.
MAX SCHUL.